Aug. 25, 1931.　　　　C. ANDERSON　　　　1,820,765
HAND TRUCK
Filed March 1, 1929
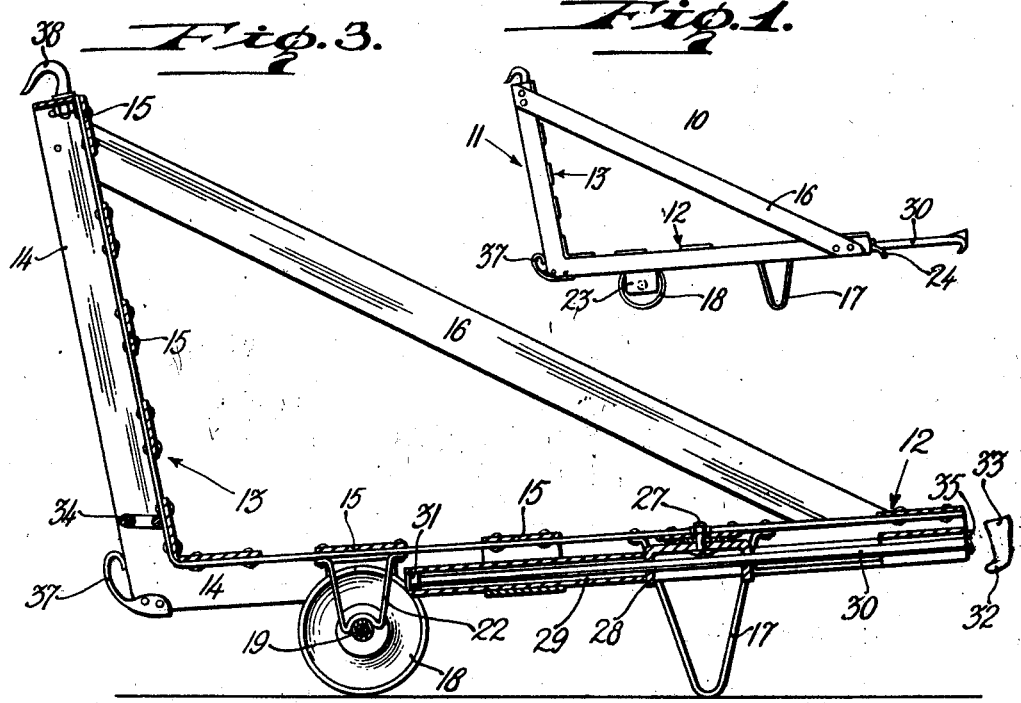
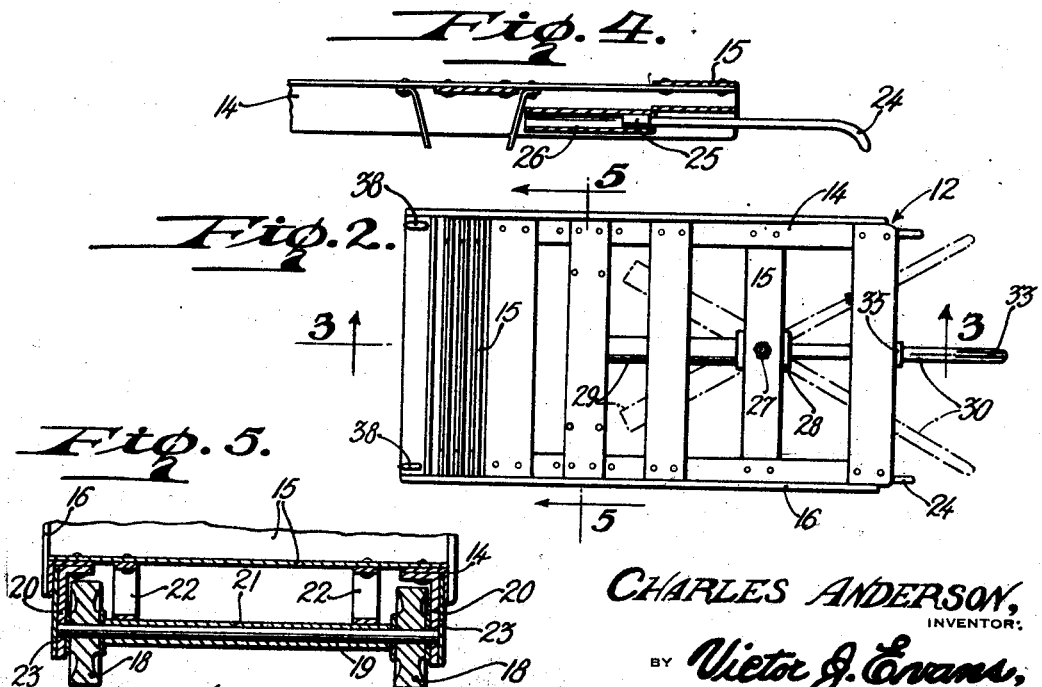
Charles Anderson, Inventor
By Victor J. Evans, Attorney Patented Aug. 25, 1931

1,820,765

UNITED STATES PATENT OFFICE

CHARLES ANDERSON, OF ELTINGVILLE, STATEN ISLAND, NEW YORK

HAND TRUCK

Application filed March 1, 1929. Serial No. 343,714.

This invention relates to improvements in hand trucks.

The primary object of the invention resides in a hand truck for facilitating the handling of freight in the loading and unloading of a ship's cargo, and for use in short hauls on steamship piers and like freight terminals.

Another object of the invention is to provide a hand truck which may be converted into a trailer by connecting a number of trucks, end to end, which may be pulled by any suitable motive power, such as a tractor, the truck being provided with a draw bar extensible beyond one end of the body thereof, and turnable with respect to the body thereof, and an eye at the other end whereby the hook provided on the free end of the draw bar of one truck may be detachably connected to the eye of the next adjacent truck. By turnably mounting the draw bar to the truck body, the truck may be sharply turned when in coupled formation.

A further object is the provision of a hand truck having handles which may be extended for manual manipulation of the truck, and which may be moved to an out of the way position when the draw bar is extended for use.

With these and other objects in view, the invention resides in certain novel construction and combination and arrangement of parts, the essential features of which are hereinafter fully described, are particularly pointed out in the appended claims, and are illustrated in the accompanying drawings, in which:—

Figure 1 is a side elevation of my improved truck with the handles in inoperative position and the draw-bar in an extended position for use.

Figure 2 is a top plan view thereof.

Figure 3 is an enlarged vertical sectional view on the line 3—3 of Figure 2.

Figure 4 is a detail vertical sectional view through one of the handles showing the same in operative position.

Figure 5 is a detail vertical transverse sectional view on the line 5—5 of Figure 3.

Referring to the drawings by reference characters, the numeral 10 designates my improved hand truck in its entirety, which includes a body 11 constructed of steel or other strong material. The body 11 includes a substantially horizontal bed 12 and front wall 13 extending upward from said bed at an obtuse angle. The bed and front wall are constructed of side rails 14 connected by transverse spaced slats 15. Diagonal side braces 16 connect the bed and front wall for strengthening purposes and for preventing accidental side slipping of a load carried thereby.

The truck is supported adjacent its rear end by depending feet 17, and adjacent its front end by two aligned wheels 18 freely rotatable upon a transverse axel 19 mounted in brackets 20 depending from the underside of the truck body. A tubular spacing sleeve 21 houses the shaft and maintains the wheels in spaced relation, while brace brackets 22 depending from the truck body embrace the tubular sleeve and which tends to distribute the weight of the load along the axel rather than at the two ends thereof. Plates 23 fixed to the side rails of the body overlie the ends of the axel to prevent lateral shifting of the same and to conceal said ends. From the description of the wheels and mounting therefor, it will be noted that the ends of the axels do not project beyond the plane of the side rails of the body and the use of cotter pins and like fastenings are dispensed with.

For manual manipulation of the truck, I provide handle members 24, the inner ends of which are provided with cylindrical heads 25, slidable in cylinders 26 fixedly mounted beneath the side rails. The handles 24 are thus slidably mounted and may be pulled out for use, or slid inwardly out of the way when not in use or when the truck is used as a trailer in a manner now to be described.

Turnably mounted as at 27 to one of the transverse cross slats 15 of the bed 12, is an inverted U-shape bracket 28 carrying a forwardly extending cylinder 29. Slidably mounted in the legs of the bracket 28 is a draw bar 30 having a cylindrical head 31 at its forward end for sliding within the cylinder 29 while its opposite end terminates in a down-turned hook 32. A fin 33 rises above the hook for preventing the hook of one truck from accidentally riding out of engagement of the eye 34 of the next adjacent truck with which it connects. The eye 34 is mounted on the front wall on horizontal plane slightly above the plane of the draw-bar so that the feet of the trucks are supported above the ground. The fin 33 will strike the truck body at the front should the coupled train of trucks come to an abrupt stop to prevent accidental separation of the hook from its connecting eye.

The draw-bar is provided with a stop collar or flange 35 which engages the bracket 28 when pushed inward to an inoperative position to limit inward movement of the same, and when pulled out for use, the strain of the truck body upon the draw bar causes a slight flex or bend therein whereupon the collar engages the rear end of the bed to limit inward movement of the draw bar.

From the foregoing, it will be seen that when a number of these hand trucks are coupled together, the draw bars 30 of the respective trucks may turn laterally, thus allowing the coupled trucks to be sharply turned which is at present a serious problem in the handling of a train of trucks especially where congested conditions prohibit wide turns.

The truck body 11 is so balanced that it may be tilted forward to rest upon the corner feet or shoes 37, or may be further tilted with ease so that the front wall 13 rests upon the ground for facilitating loading and unloading of the same.

The feet or shoes 37 may be used as a brake when the truck is travelling down hill by allowing the same to drag upon the ground. This braking action overcomes the energy which otherwise would be required to keep the truck under control.

Hooks 38 are provided at the top of the front wall 13 to which cables or loops may be secured for hoisting the entire truck, it being of course understood that a cable would also have to be placed beneath the rear end of the truck body to assure raising of the truck with its load on an even keel.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. A hand truck including a body supported upon wheels, a bracket turnably mounted to the underside of said body, a coupling bar slidably mounted in said bracket, stop means for limiting inward and outward movement of said coupling bar to inoperative and operative positions respectively, said coupling bar having a hook at its outer end for engagement with a coupling eye secured to another truck, and a fin adjacent to said hook arranged to engage the body of said other truck to restrain unintentional dislodgment of said hook from said eye.

2. A hand truck including a body supported upon wheels, a bracket turnably mounted to the underside of said body, a cylinder extending from said bracket, a coupling bar provided with a head at one end for sliding within said cylinder and a coupling hook on the opposite end for coupling engagement with another truck to be connected, the hook end of said coupling bar being extendable beyond one end of said body, and a stop member on said coupling bar adapted to engage the end of said body when in operative extended position with a load supported upon said body.

In testimony whereof I have affixed my signature.

CHARLES ANDERSON.